US009998029B2

(12) United States Patent
Kouno et al.

(10) Patent No.: US 9,998,029 B2
(45) Date of Patent: Jun. 12, 2018

(54) INVERTER AND INVERTER DEVICE

(71) Applicant: Kabushiki Kaisha Toshiba, Tokyo (JP)

(72) Inventors: Yuusuke Kouno, Tokyo (JP); Yoichi Morishima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/607,799

(22) Filed: May 30, 2017

(65) Prior Publication Data
US 2017/0353127 A1    Dec. 7, 2017

(30) Foreign Application Priority Data

Jun. 7, 2016   (JP) ................. 2016-113643

(51) Int. Cl.
*H02M 3/315*   (2006.01)
*H02M 7/493*   (2007.01)
*H02M 1/00*    (2006.01)

(52) U.S. Cl.
CPC .... *H02M 7/493* (2013.01); *H02M 2001/0009* (2013.01); *H02M 2001/0025* (2013.01)

(58) Field of Classification Search
CPC . H02M 2001/0025; H02M 2001/0009; H02M 7/493
USPC .... 363/21.1–21.18, 52, 55, 56.01–56.03, 95, 363/97, 98, 131, 132
See application file for complete search history.

(56) References Cited

U.S. PATENT DOCUMENTS

| | | | |
|---|---|---|---|
| 2002/0036911 A1* | 3/2002 | Okui | H02J 9/062 363/95 |
| 2004/0027757 A1* | 2/2004 | Minatani | B60L 3/0023 361/91.1 |
| 2006/0012328 A1* | 1/2006 | Yasukawa | H02P 27/04 318/719 |
| 2006/0245221 A1* | 11/2006 | Ohshima | H02M 7/493 363/131 |
| 2010/0156186 A1* | 6/2010 | Kim | H01M 16/003 307/72 |
| 2014/0011141 A1* | 1/2014 | Matsumoto | F23C 5/32 431/12 |

(Continued)

FOREIGN PATENT DOCUMENTS

JP    2004-140909 A    5/2004
JP    2014-138493 A    1/2013

*Primary Examiner* — Adolf Berhane
*Assistant Examiner* — Nusrat Quddus
(74) *Attorney, Agent, or Firm* — Baker Botts L.L.P.

(57) ABSTRACT

According to one embodiment, an inverter including a detector which detects a value of an output voltage and a value of an output current; a command value input unit which is capable of receiving a current command value; a current command value compensating unit which, when the value of the output voltage detected by the detector is equal to or lower than a predetermined value, computes a compensation current value for compensating the current command value; an adder which adds the compensation current value to the current command value and outputs the compensated current command value; and a current controller which computes a voltage command value so that a difference between the compensated current command value and the output current detected by the detector becomes zero.

4 Claims, 8 Drawing Sheets

(56) References Cited

U.S. PATENT DOCUMENTS

| | | | | |
|---|---|---|---|---|
| 2014/0077738 A1* | 3/2014 | Iwaji | ................ | H02P 27/08 318/400.36 |
| 2015/0380948 A1* | 12/2015 | Mazaki | ................ | H02M 7/217 307/104 |
| 2017/0149369 A1* | 5/2017 | Watabu | ................ | H02P 27/06 |

* cited by examiner

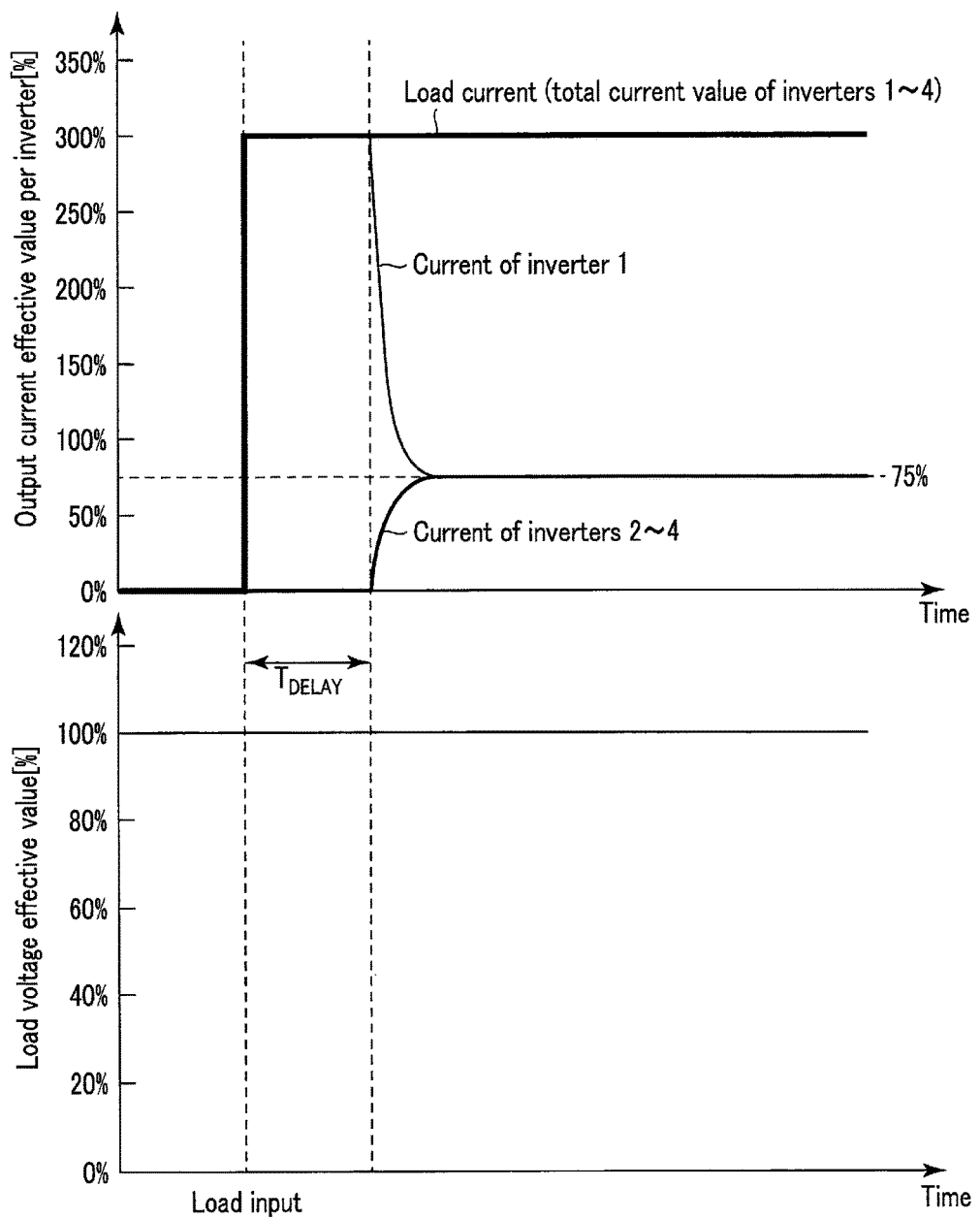
F I G. 5

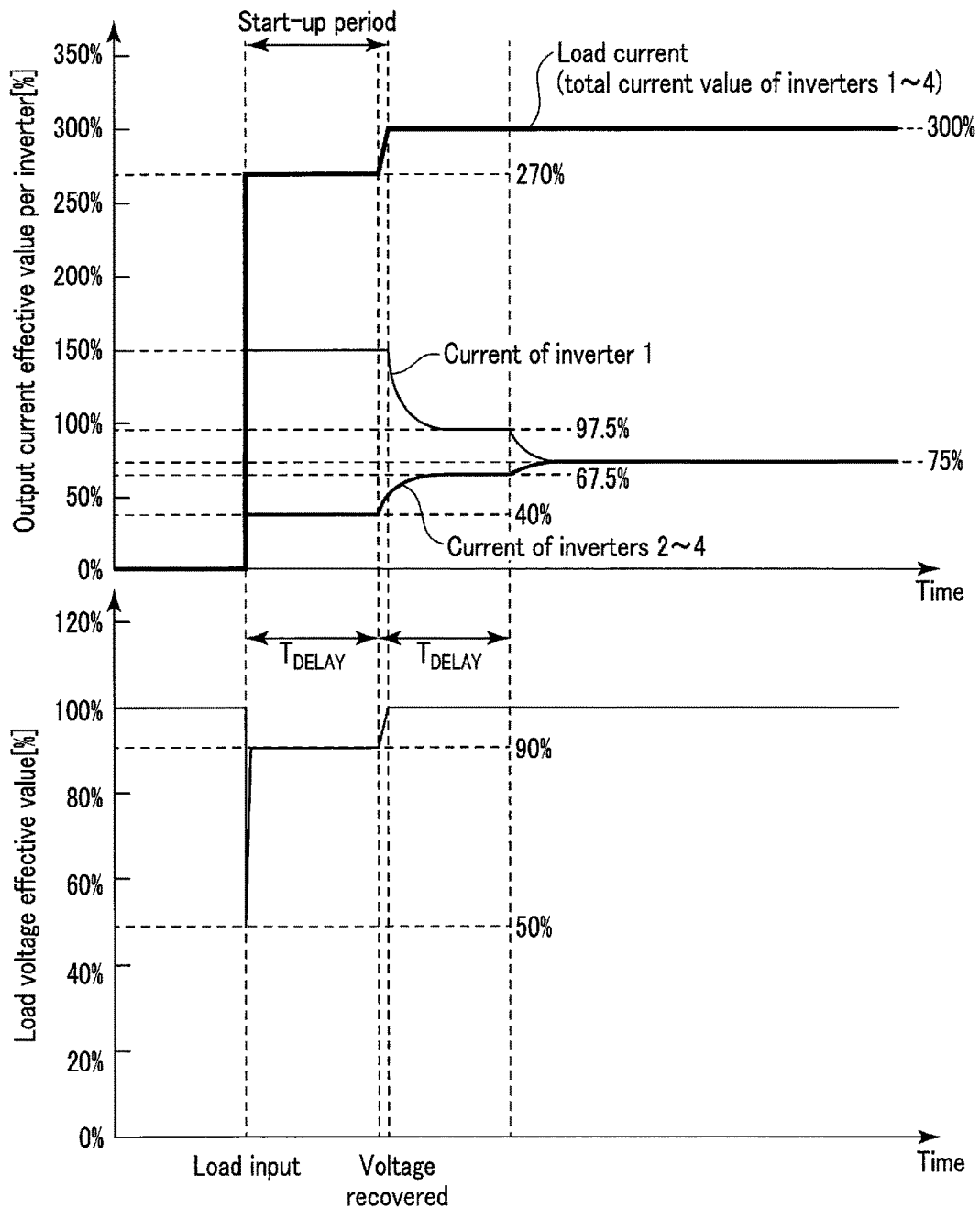
F I G. 7

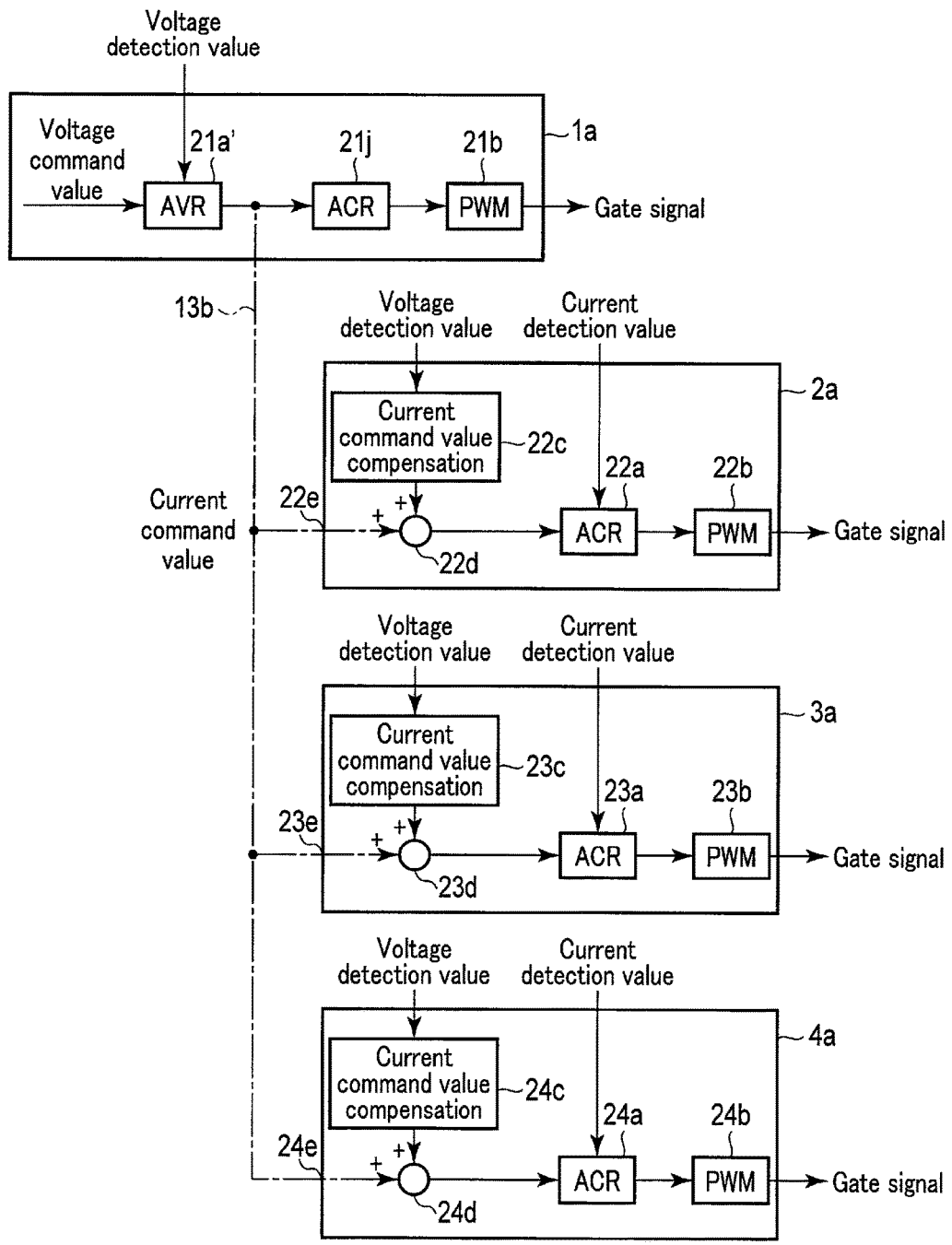
F I G. 10

INVERTER AND INVERTER DEVICE

CROSS-REFERENCE TO RELATED APPLICATION

This application is based upon and claims the benefit of priority from Japanese Patent Application No. 2016-113643, filed Jun. 7, 2016; the entire contents of which are incorporated herein by reference.

FIELD

Embodiments described herein relate generally to an inverter and an inverter device.

BACKGROUND

An inverter device that can supply power to a load by a plurality of inverters connected in parallel is suggested. As a system for performing autonomous parallel operation of a plurality of parallelly-connected inverters, for example, there is a system in which one inverter operates as a voltage source, and the other inverters operate as a current source, which is suggested as a master-slave system.

BRIEF DESCRIPTION OF THE DRAWINGS

FIG. 5 is a diagram for explaining an exemplary operation example of an inverter device of a comparative example.

FIG. 7 is a diagram for explaining another exemplary operation example of the inverter device of the first embodiment.

FIG. 10 is a block diagram schematically showing exemplary configuration examples of controllers of a second inverter to a fourth inverter.

DETAILED DESCRIPTION

An inverter according to an embodiment comprises a detector which detects a value corresponding to an output voltage and a value of an output current; a command value input unit which receives a current command value; a current command value compensating unit which, when the value of the output voltage detected by the detector is equal to or lower than a predetermined value, computes a compensation current value for compensating the current command value; an adder which adds the compensation current value to the current command value and outputs the compensated current command value; and a current controller which computes a voltage command value so that a difference between the compensated current command value and the output current detected by the detector becomes zero.

Hereinafter, an inverter and an inverter device of a plurality of embodiments will be explained with reference to the drawings.

Figure 1:
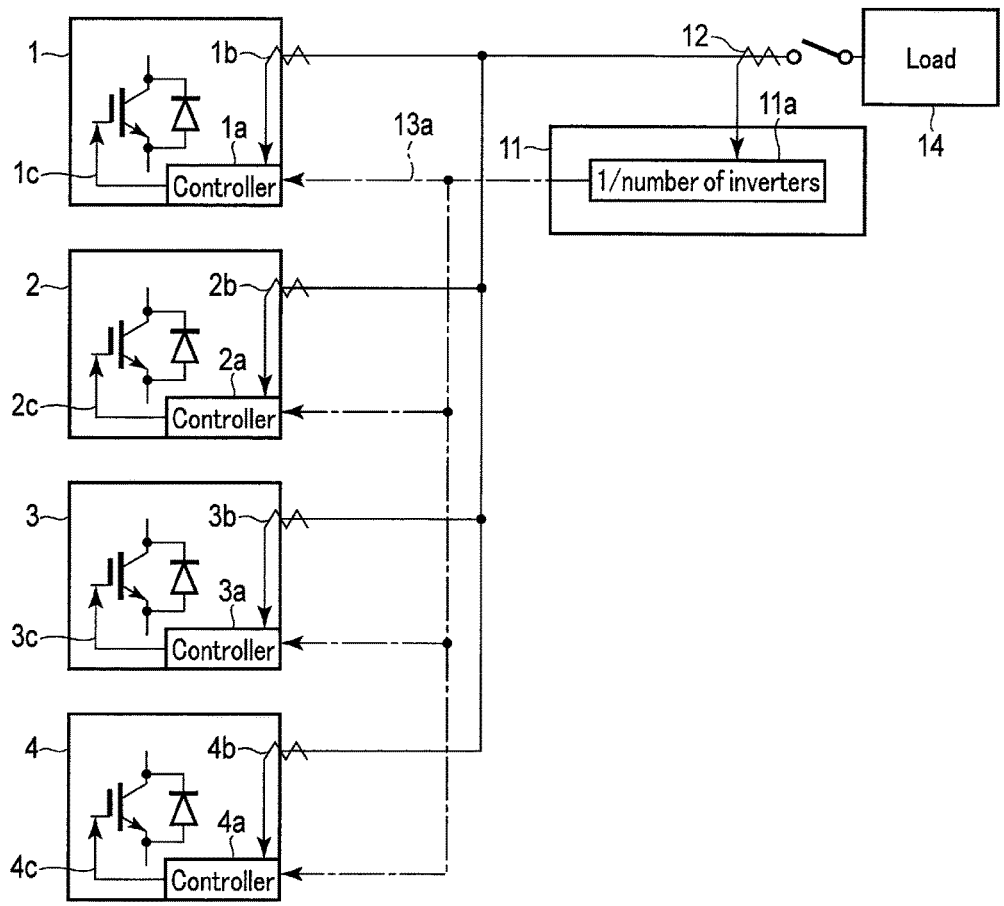
FIG. 1 is a block diagram schematically showing an exemplary configuration example of an inverter device of a first embodiment.

FIG. 1 is a block diagram schematically showing an exemplary configuration example of an inverter device of a first embodiment.

The inverter device of the present embodiment includes a plurality of inverters connected in parallel with respect to a load 14, and supplies alternating-current (AC) power to the load 14. The inverter device shown in FIG. 1 comprises a first inverter 1, a second inverter 2, a third inverter 3, a fourth inverter 4, an upper command device 11, and a current detector 12.

The current detector 12 detects a current supplied to the load 14 from the plurality of inverters (the first inverter 1 to the fourth inverter 4). The current detector 12 outputs a value corresponding to the detected current (load current value) to the upper command device 11.

The first inverter 1 to the fourth inverter 4 can be connected in parallel with respect to the load 14 via a switch (for example, contactor, relay circuit, etc.). The first inverter 1 to the fourth inverter 4 may convert a direct-current (DC) power supplied from a direct-current (DC) power source, for example, such as an unillustrated battery into AC power, and output the AP power to the load 14.

The first inverter 1 comprises a plurality of switching elements (for example, IGBT, MOSFET, etc.), a detector $1b$ for detecting a value corresponding to an output voltage and an output current to the load 14, and a controller $1a$ for generating and outputting a gate signal of the switching elements based on a voltage value and a current value detected by the detector $1b$ and a voltage command value. The first inverter 1 may have an unillustrated DC power source connected to a main circuit wiring on a high potential side thereof and a main circuit wiring on a low potential side thereof.

At each phase in the first inverter 1, a pair of switching elements is connected in series between the main circuit wiring on the high potential side and the main circuit wiring on the low potential side, and an output AC line of each phase is connected between the pair of switching elements. In the present embodiment, the first inverter 1 may be an inverter operating as a voltage source.

The controller $1a$ of the first inverter 1 can perform voltage control (AVR) so that a load voltage becomes a desired voltage value and frequency.

The second inverter 2 comprises a plurality of switching elements (for example, IGBT, MOSFET, etc.), a detector $2b$ for detecting a value corresponding to an output voltage and an output current to the load 14, and a controller $2a$ for generating and outputting a gate signal of the switching elements based on a voltage value and a current value detected by the detector $2b$ and a current command value. The second inverter 2 has an unillustrated DC power source connected to a main circuit wiring on a high potential side thereof and a main circuit wiring on a low potential side thereof.

At each phase in the second inverter 2, a pair of switching elements is connected in series between the main circuit wiring on the high potential side and the main circuit wiring on the low potential side, and an output line of each phase is connected between the pair of switching elements.

The third inverter 3 comprises a plurality of switching elements (for example, IGBT, MOSFET, etc.), a detector 3b for detecting a value corresponding to an output voltage and an output current to the load 14, and a controller 3a for generating and outputting a gate signal of the switching elements based on a voltage value and a current value detected by the detector 3b and a current command value. The third inverter 3 has an unillustrated DC power source connected to a main circuit wiring on a high potential side thereof, and a main circuit wiring on a low potential side thereof.

At each phase in the third inverter 3, a pair of switching elements is connected in series between the main circuit wiring on the high potential side and the main circuit wiring on the low potential side, and an output line of each phase is connected between the pair of switching elements.

The fourth inverter 4 comprises a plurality of switching elements (for example, IGBT, MOSFET, etc.), a detector 4b for detecting a value corresponding to an output voltage and an output current to the load 14, and a controller 4a for generating and outputting a gate signal of the switching elements based on a voltage value and a current value detected by the detector 4b and a voltage command value. The fourth inverter 4 has an unillustrated DC power source connected to a main circuit wiring on a high potential side thereof and a main circuit wiring on a low potential side thereof.

At each phase in the fourth inverter 4, a pair of switching elements is connected in series between the main circuit wiring on the high potential side and the main circuit wiring on the low potential side, and an output line of each phase is connected between the pair of switching elements.

In the present embodiment, the second inverter 2 to the fourth inverter 4 may be inverters operating as current sources. The controllers 2a to 4a of the second inverter 2 to the fourth inverter 4 can perform current control (ACR) so as to follow the current command value provided by the upper command device 11. The inverter device of the present embodiment can have at least one inverter that operates as a current source.

The upper command device 11 is connected to the first inverter 1 to the fourth inverter 4 via a transmission path 13a in a communicable manner with each of the first inverter 1 to the fourth inverter 4.

The upper command device 11 may be a computing circuit including, a memory and at least one processor. In the present embodiment, the processor may be a central processing unit (CPU) or a micro processing unit (MPU). In the upper command device 11, a value obtained by dividing the load current value detected at the current detector 12 by the number of parallelly connected inverters is transmitted as the current command value to each of the second inverter 2 to the fourth inverter 4 via the transmission path 13a.

In the present embodiment, the rated current of the first inverter 1 to the fourth inverter 4 is identical, and an output power (or output current) is desired to be identical between each of the first inverter 1 to the fourth inverter 4 when the inverter device is in operation. In the case where four inverters are connected in parallel, for example, the output currents from the four inverters can be made even by dividing the load current value by the number of parallelly connected inverters to obtain a current command value provided to each of the second inverter 2 to the fourth inverter 4 operating as the current source.

The upper command device 11 may also receive a signal indicating soundness (including operating status such as being active or inactive) from the first inverter 1 to the fourth inverter 4, and transmit to the first inverter 1 to the fourth inverter 4 a signal indicating whether it is an inverter operating as a voltage source or an inverter operating as a current source, and a signal that parallels off the connection with the load 14. When the first inverter 1, for example, operates all of the time as the voltage source, the transmission path 13a connected between the upper command device 11 and the first inverter 1 may be omitted.

Figure 2:
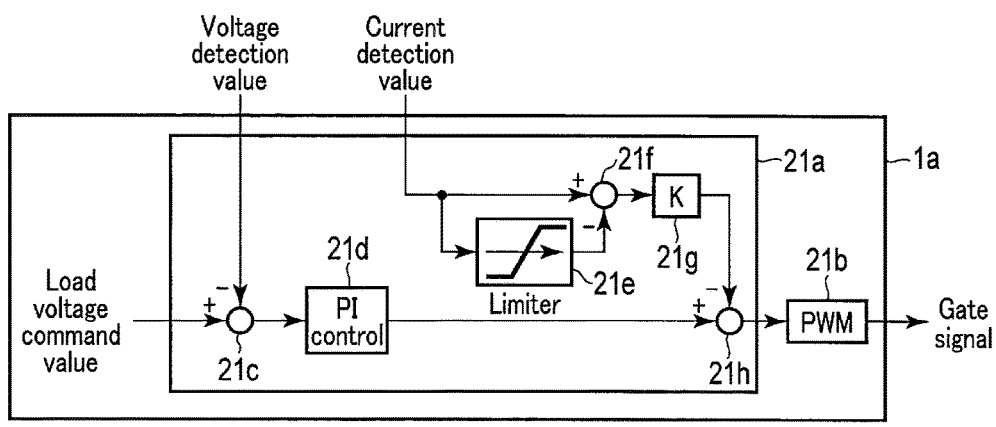
FIG. 2 is a block diagram schematically showing an exemplary configuration example of a controller of a first inverter.

FIG. 2 is a block diagram schematically showing an exemplary configuration example of the controller 1a of the first inverter 1.

The controller 1a comprises a voltage controller 21a and a PWM processing unit 21b.

The voltage controller 21a comprises a subtractor 21c, a proportional integral (PI) controller 21d, a limiter 21e, a subtractor 21f, a gain multiplier 21g, and a subtractor 21h. The voltage command value and the voltage value detected by the detector 1b are input to the subtractor 21c. The subtractor 21c can subtract the detected voltage value from the voltage command value, and output a difference value. The voltage command value input to the subtractor 21c may be, for example, a value (load voltage command value) preset based on a rated voltage of the load 14.

The difference value output from the subtractor 21c is input to the PI controller 21d. The PI controller 21d can compute an inverter voltage command value so that the input difference becomes zero and output the result thereof.

A current value detected by the detector 1b is input to the limiter 21e. In the case where the input current value exceeds a predetermined upper limit threshold, or is lower than a predetermined lower limit threshold, the limiter 21e can output the predetermined upper limit threshold or lower limit threshold.

The current value detected by the detector 1b and the output value of the limiter 21e are input in the subtractor 21f. The subtractor 21f can subtract the output value of the limiter 21e from the current value detected by the detector 1b and output a difference value.

The difference value output from the subtractor 21f is input to the gain multiplier 21g. The gain multiplier 21g can multiply the difference value output from the subtractor 21f by a preset gain K.

The voltage command value output from the PI controller 21d and the value output from the gain multiplier 21g are input to the subtractor 21h. The subtractor 21h can subtract the value output from the gain multiplier 21g from the voltage command value, and output a difference value. That is, the difference value output from the subtractor 21h is a second voltage command value which is compensated to become smaller than the voltage command value in proportion to the magnitude the current value detected at the detector 1b exceeds a predetermined threshold. By compensating the voltage command value in the above manner, an overcurrent of the first inverter 1 can be suppressed.

The second voltage command value output from the voltage controller 21a is input to the PWM processing unit 21b. The PWM processing unit 21b can generate and output a gate signal by comparing the input second voltage command value with the value of a triangular wave.

Figure 3:
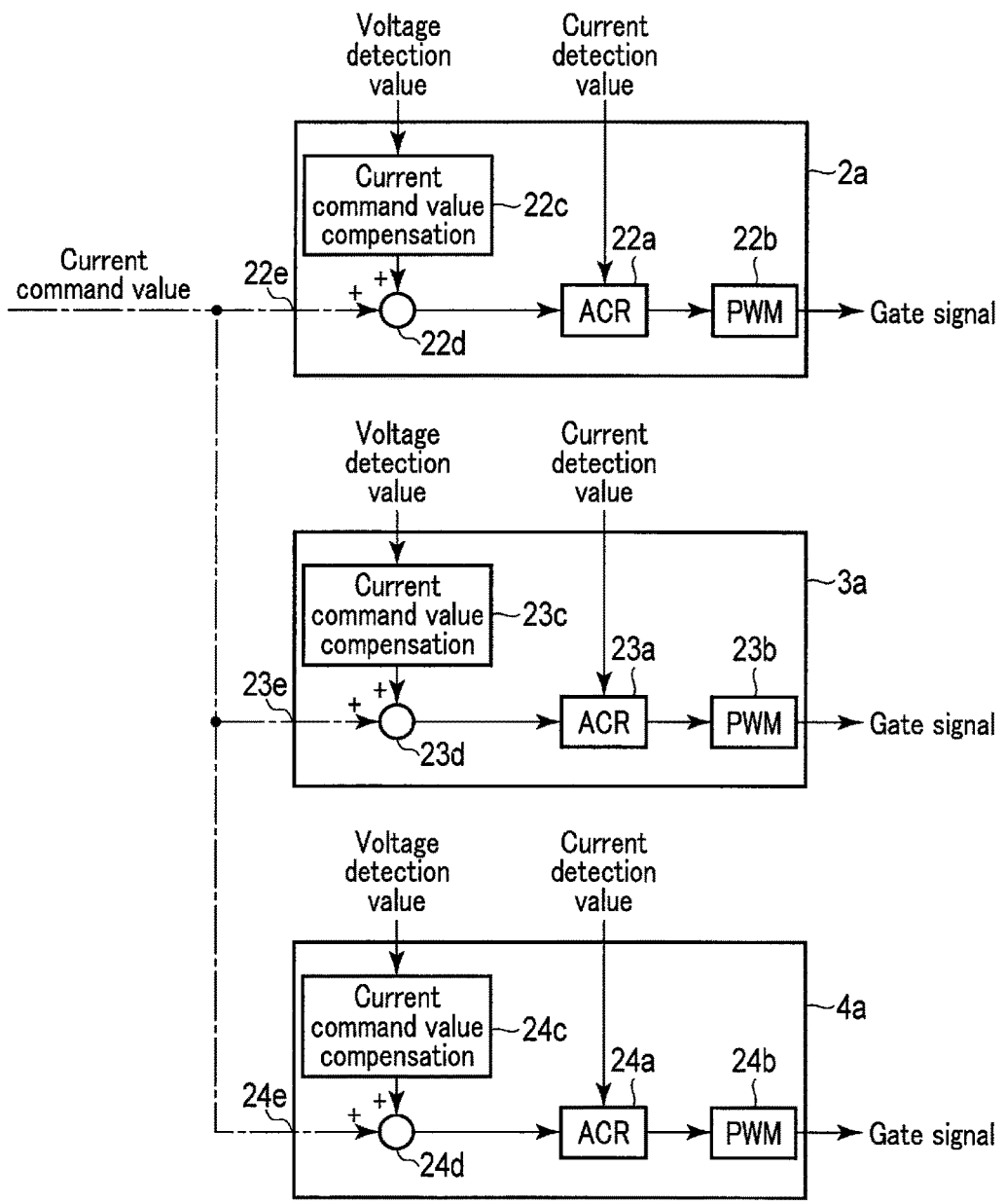
FIG. 3 is a block diagram schematically showing exemplary configuration examples of controllers of a second inverter to a fourth inverter.

FIG. 3 is a block diagram schematically showing exemplary configuration examples of controllers 2a to 4a of the second inverter 2 to the fourth inverter 4. In each of the controllers 2a to 4a of the second inverter 2 to the fourth inverter 4, current command value compensating units 22c to 24c can calculate a compensation amount of the current command value in accordance with the detected output voltage value and add a compensation value to the current command value obtained from the transmission path 13a to suppress the output current from decreasing.

Since the controllers 2a to 4a may have the same configurations, hereinafter, the configuration of the controller 2a will be explained, and the explanation of the controllers 3a and 4a will be omitted.

The controller 2a comprises a current controller 22a, a PWN processing unit 22b, a current command value compensating unit 22c, an adder 22d, and a command value input unit 22e.

A voltage value detected by the detector 2b is input to the current command value compensating unit 22c. The current command value compensating unit 22c can output a compensation amount of the current command value in accordance with the input voltage value.

Figure 4:
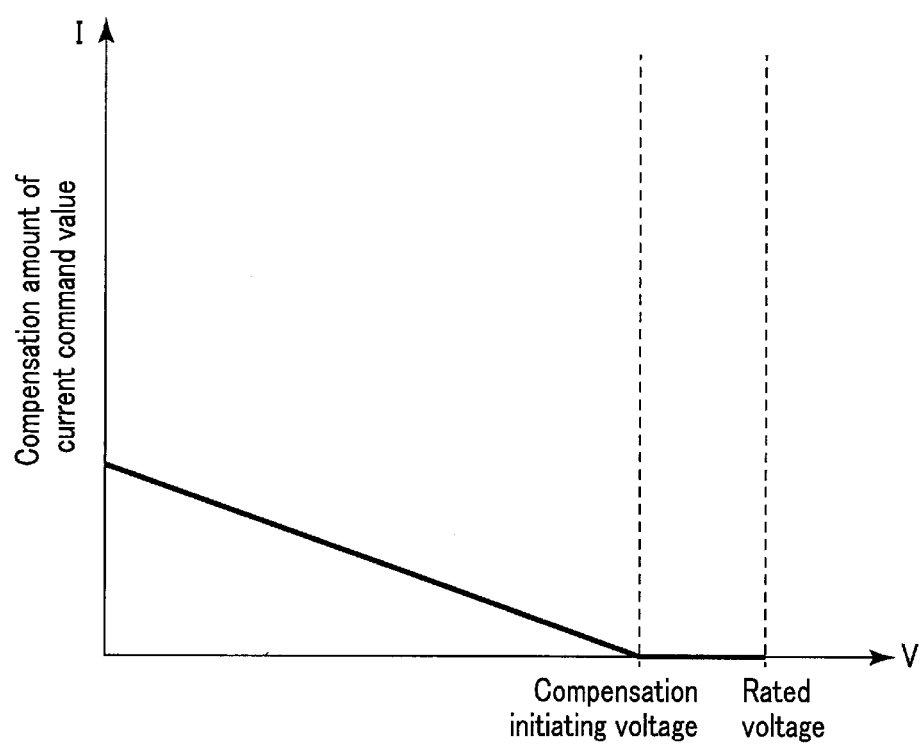
FIG. 4 is a diagram for explaining an exemplary operation example of a current command value compensating unit.

FIG. 4 is a diagram for explaining an exemplary operation example of the current command value compensating unit 22c.

In the present embodiment, in the case where an output voltage is lower than voltage A (compensation initiation voltage), the current command value compensating unit 22c may determine a compensation amount of the current command value in accordance with the reduced extent of the output voltage. The voltage A may be a voltage value lower than the rated voltage. The compensation amount of the current command value may increase as the difference between the output voltage and the voltage A of the second inverter 2 increases.

The current command value input from the command value input unit 22e and the compensation amount of the current command value output from the current command value compensating unit 22c are input to the adder 22d. The adder 22d can add the compensation amount of the current command value to the current command value and output a first current command value (compensated current command value).

The current value detected by the detector 2b and the first current command value are input to the current controller 22a. The current controller 22a can perform proportional control or proportional-integral control so that the difference between the input current value and the first current command value becomes zero. The output of the current controller 22a is a voltage command value of the second inverter 2.

The voltage command value of the second inverter 2 is input to the PWM processing unit 22b from the current controller 22a. The PWM processing unit 22b can generate and output a gate signal by comparing the input voltage command value with the value of a triangular wave.

By adding the compensation amount of the current command value to the current command value input from an outside source in the above manner, even during a period in which the voltage of the inverter device is decreased by a communication delay from the upper command device 11, it is possible to output a current in accordance with the compensation amount from the second inverter 2 to the fourth inverter 4, and immediately recover the output voltage.

In the following, an operation example of the inverter device of the present embodiment will be explained.

Here, an example of a case in which a load 14 of 30 kW is applied from an unloaded state to, for example, an inverter device which has four 10 kW rating inverters 1 to 4 connected in parallel will be explained.

When the output power of each of the four inverters 1 to 4 is balanced after the load 14 is applied, a power of 7.5 kW (=30 kW/four inverters) will be output per inverter. Accordingly, the inverter output power will become 75% with respect to the rating (=7.5 kw/10 kW). Accordingly, at the rated voltage, the output current will also be 75% of the rating.

FIG. 5 is a diagram for explaining an exemplary operation example of an inverter device of a comparative example.

In the inverter device of the comparative example, in a state where it is assumed that a load voltage is not varied by a load input, when a communication delay is $T_{DELAY}$, each inverter may be assigned a current as shown in FIG. 5. That is, during the communication delay period $T_{DELAY}$, the current command values of the second inverter 2 to the fourth inverter 4 would not be reassigned, and the output currents of the second inverter 2 to the fourth inverter 4 would remain zero. Therefore, during this communication delay period $T_{DELAY}$, a load current of 300% with respect to the rated current of one inverter will be born only by the first inverter 1. However, a current that significantly exceeds the rated current of the inverter may instantly cause damage to the inverter.

Therefore, in the present embodiment, in order to suppress the burden on the first inverter 1, the load voltage is reduced to reduce the load current. That is, in the voltage controller 21a, by multiplying the difference value between the detected current value and the limited current value by a gain and subtracting this from the inverter voltage command value, the inverter voltage command value is reduced in accordance with a value the inverter current exceeded the limiter (a predetermined threshold). As a result, an overcurrent of the inverter 1 can be suppressed.

Figure 6:
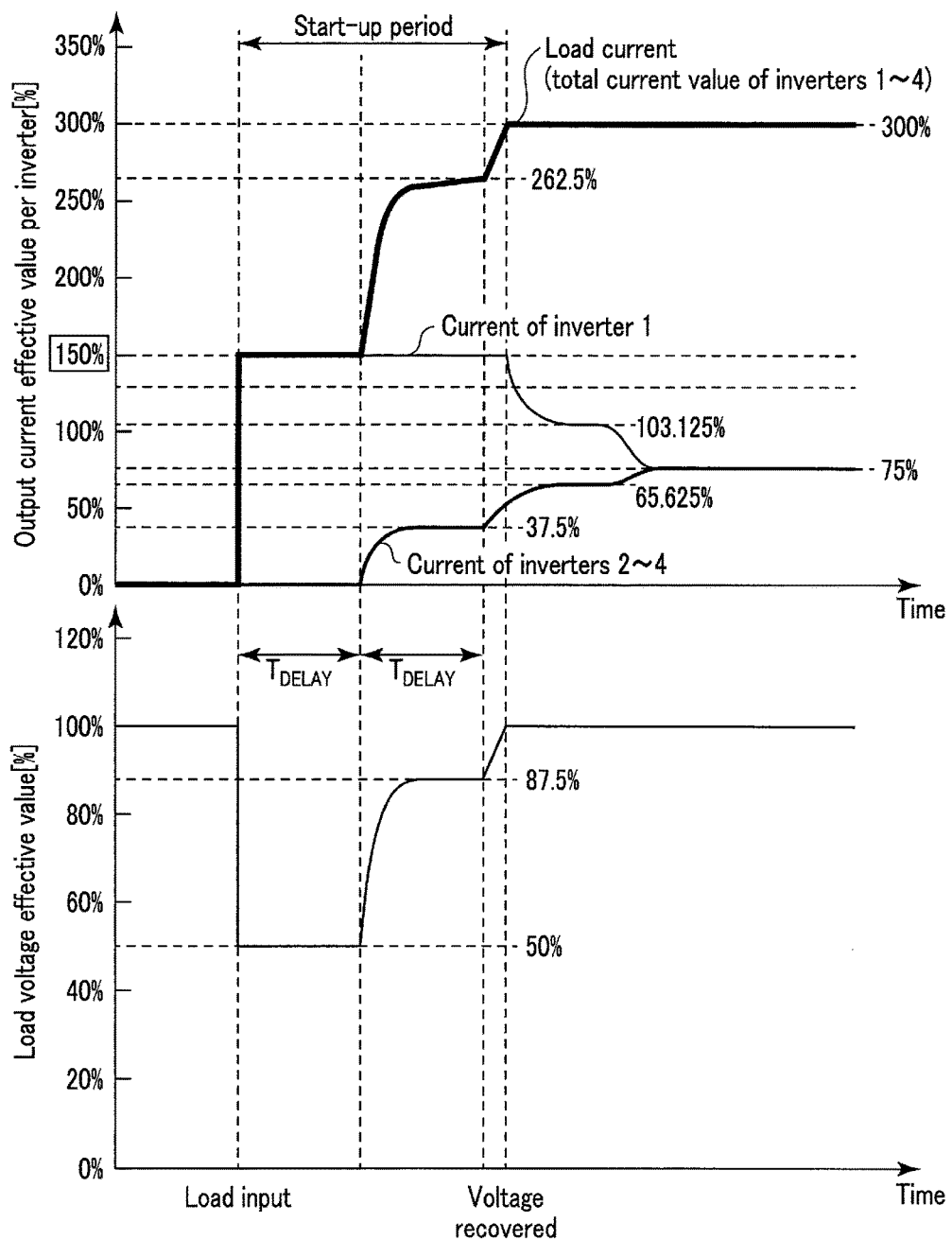
FIG. 6 is a diagram for explaining an exemplary operation example of the inverter device of the first embodiment.

FIG. 6 is a diagram for explaining an exemplary operation example of the inverter device of the present embodiment.

In this example, in the first communication delay period $T_{DELAY}$ after the load input, for example, in order to suppress the load current to 150%, the load voltage is instantaneously reduced to 50% by the voltage control of the first inverter 1.

After the lapse of the first communication delay period $T_{DELAY}$ after the load input, in the second communication delay period $T_{DELAY}$, the current command value of the second inverter 2 to the fourth inverter 4 becomes the load current suppressed to 37.5% (=150% with respect to the rated current/four inverters). Therefore, even if the first inverter 1 outputs a current of 150% of the rating, the load current becomes 262.5% (=150%+37.5%×three inverters), and the output voltage is recovered up to 87.5% (=262.5/300 [%]).

Furthermore, after the lapse of the second communication delay period $T_{DELAY}$, the current command value to the second inverter 2 to the fourth inverter 4 becomes 65.625% (=load current of 262.5%/four inverters), and the current of the first inverter 1 necessary for outputting 300% of the rated load current becomes 103.125% (=300%−65.625%×three inverters), which is equal to or lower than the current limiter. At this time, the parallel circuit including the inverter 1 to the inverter 4 comes into a state of being able to output the rated voltage and rated current.

From this point on, since the current command value to the second inverter 2 to the fourth inverter 4 becomes 75% (=load current of 300%/four inverters), the output current from the first inverter 1 to the fourth inverter 4 becomes even. In FIG. 6, it takes more than three times the communication delay period $T_{DELAY}$ for the output current of each of the first inverter 1 to the fourth inverter 4 to become even after the load is applied; however, prior to this, the current of the first inverter 1 becomes equal to or lower than the current limiter, and the start-up period of the load current (a period in which the load current of the inverter device is lower than the current demanded by the load 14) becomes equal to or more than twice and less than three times the communication delay period $T_{DELAY}$. In other words, by limiting the load voltage in the first inverter 1, a start-up period of the load voltage (a period in which the load voltage of the inverter device is lower than the voltage demanded by the load 14) becomes more than twice and less than three times the communication delay period $T_{DELAY}$ due to the communication delay; however, the burden of the load current on the first inverter 1 can be reduced, thereby, circumventing an overcurrent.

FIG. 7 is a diagram for explaining another exemplary operation example of the inverter device of the present embodiment. In this example, the load voltage at the controller 1a of the first inverter 1 is reduced after the load applied. Furthermore, by detecting the reduction of the output voltage by the detectors 2b to 4b of the second inverter 2 to the fourth inverter 4 and immediately increasing the currents of the second inverter 2 to the fourth inverter, the concentration of currents to the first inverter 1 is mitigated, and the reduction rate of the load voltage and the reduction period of the load voltage are improved.

That is, in the case of suppressing the load current to 150% in the first communication delay period $T_{DELAY}$ after the load applied, the load voltage is instantaneously reduced to 50% by the voltage control of the first inverter 1. The second inverter 2 to the fourth inverter 4 detect the reduction in the output voltage and add the compensation value to the current command value to set the compensated current command value to, for example, 40%. Therefore, in the first communication delay period $T_{DELAY}$, the first inverter 1 outputs a current of 150%, and each of the second inverter 2 to the fourth inverter 4 outputs a current of 40% to obtain a load current of 270% (=150%+40%×three inverters) and an output voltage of 90% (=270/300 [%]).

After the lapse of the first communication delay period $T_{DELAY}$, the current command value to the second inverter 2 to the fourth inverter 4 becomes, for example, 67.5% (=load current of 270%/four inverters), and the current of the first inverter 1 necessary to output the rating load current 300% becomes 97.5% (=300%−67.5%×three inverters), which is equal to or lower than the current limiter. At this time, the parallel circuit including the inverter 1 to the inverter 4 comes into a state of being able to output the rated voltage and rated current.

From this point on, since the current command value to the second inverter 2 to the fourth inverter 4 becomes 75% (=load current of 300%/four inverters), the output current from the first inverter 1 to the fourth inverter 4 becomes even.

In the present embodiment, by appropriately setting the inclination of the current compensation amount with respect to the output voltage in the manner mentioned above, in the first delay period $T_{DELAY}$, it is possible to output a current to which the compensation amount is added from the second inverter 2 to the fourth inverter 4, and immediately recover the output voltage up to around the voltage A. In this example, the start-up period of the load current is equal to or more than the communication delay period $T_{DELAY}$ and less than twice the communication delay period $T_{DELAY}$, which allows the start-up period of the load voltage that is influenced by the communication delay to become shorter.

Conventionally, for example, in either case of detecting the current on a load side and transmitting it to each inverter, or transmitting the current command value calculated at an inverter operating as a voltage source to each inverter, a communication delay to an inverter operating as a current source would sometimes occur.

Furthermore, conventionally, after load applied (for example, after a load is connected from a state of not being connected), for example, when an inverter operating as a current source continues to output a current in accordance with a current command value before the load applied in a communication delay period, there was a problem that the current of a plurality of inverters connected in parallel would not become even, and the load current would concentrate on an inverter operating as a voltage source.

Furthermore, conventionally, in the case where a load current concentrating on an inverter operating as a voltage source has caused an output current of the inverter operating as the voltage source to reach an overcurrent level, sometimes the operation of an inverter device would stop in order to circumvent damage to the inverter operating as the voltage source. Also, when the load current concentrates on the inverter operating as the voltage source, although it is possible to continue operating the inverter device without stopping by, for example, reducing the load voltage, the output voltage of the inverter device will decrease.

In contrast, according to the inverter and the inverter device of the present embodiment, in the manner mentioned above, both damage and the reduction in the output voltage can be circumvented.

In the following, an inverter and an inverter device of the second embodiment will be explained with reference to the drawings. In the following explanation, the structures that are the same as those of the inverter and the inverter device in the first embodiment will be given the same reference numerals, and the explanations thereof will be omitted.

Figure 8:
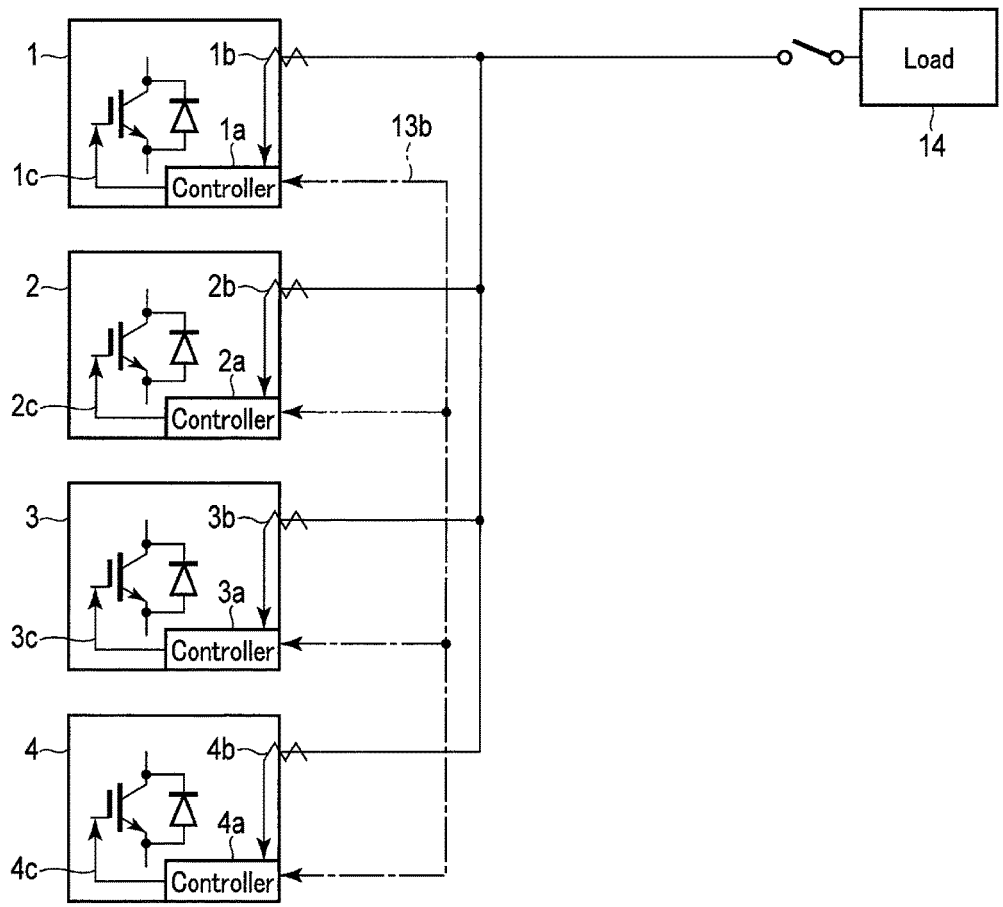
FIG. 8 is a block diagram schematically showing an exemplary configuration example of an inverter device of a second embodiment.

FIG. 8 is a block diagram schematically showing an exemplary configuration example of the inverter device of the second embodiment.

In the inverter device of the present embodiment, a controller 1a of a first inverter 1 can supply current commands to controllers 2a to 4a of a second inverter 2 to a fourth inverter 4. That is, in the inverter device of the present embodiment, the controller 1a of the first inverter 1 can also function as the upper command device 11 of the inverter device of the first embodiment.

The controllers 1a to 4a are connected to each other in a communicable manner via a transmission path 13b. The controller 1a is capable of receiving, for example, a signal indicating soundness (including operating status such as being active or inactive) from the controllers 2a to 4a. The controllers 2a to 4a are capable of receiving from the controller 1a, for example, a signal indicating whether it is an inverter operating as a voltage source or an inverter operating as a current source, and a signal that parallels off the connection with a load 14.

Figure 9:
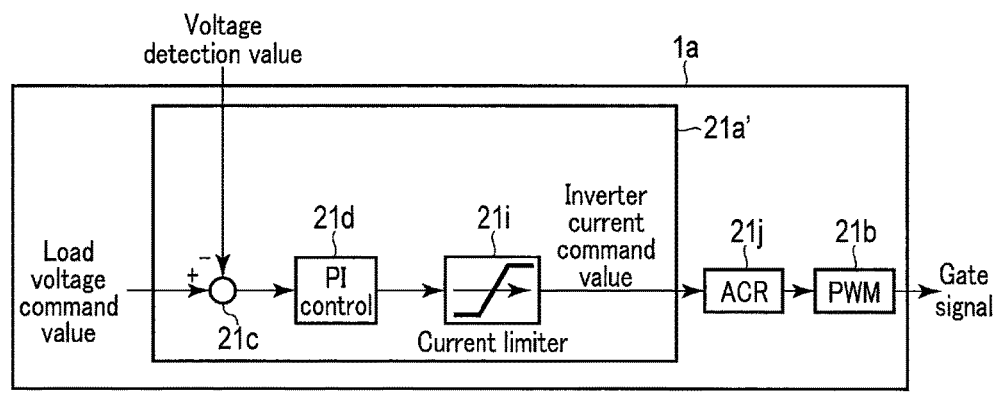
FIG. 9 is a block diagram schematically showing an exemplary configuration example of a controller of a first inverter.

FIG. 9 is a block diagram schematically showing an exemplary configuration example of the controller 1a of the first inverter 1.

The controller 1a comprises a voltage controller 21a', a current controller 21j, and a PWM processing unit 21b. The voltage controller 21a' comprises a subtractor 21c, a PI controller 21d, and a current limiter 21i.

In the subtractor 21c, a voltage command value and a voltage value detected by a detector 1b are input. The subtractor 21c can subtract the detected voltage value from the voltage command value, and outputs a difference value. The voltage command value input to the subtractor 21c is, for example, a value (load voltage command value) preset based on a rating voltage of the load 14.

The difference value output from the subtractor 21c is input to the PI controller 21d. The PI controller 21d can compute and output the current command value so that the input difference becomes zero.

The voltage command value output from the PI controller 21d is input to the current limiter 21i. The current limiter 21i can output an input inverter current command value in the case where the absolute value of the input inverter current command value is equal to or lower than the predetermined threshold. The current limiter 21i can output a predetermined threshold instead of the input inverter current command value as a limited inverter current command value in the case where the absolute value of the input inverter current command value exceeds the predetermined threshold.

The inverter current command value or the limited inverter current command value output from the current limiter 21i is input to the current controller 21j. The current controller 21j outputs an inverter voltage command value that realizes the inverter current command value or the limited inverter current command value.

The voltage command output from the voltage controller 21a is input to the PWM processing unit 21b. The PWM processing unit 21b can generate and output a gate signal by comparing the input voltage command value with a triangular wave value.

That is, in the inverter device of the present embodiment, the limited current command value may be output as the output of the voltage controller 21a', and be input to command value input units 22e to 24e of the second inverter 2 to the fourth inverter 4. This can allow the inverter current command value to be limited, which, as a result, can reduce the inverter voltage and suppress an overcurrent.

FIG. 10 is a block diagram schematically showing exemplary configuration examples of the controllers 2a to 4a of the second inverter 2 to the fourth inverter 4.

In the inverter device of the present embodiment, the current command value output from the voltage controller 21a' of the controller 1a is input to the command value input units 22e to 24e of the controllers 2a to 4a. Configurations other than the above may be the same as those in the above-mentioned first embodiment.

In the case of performing current control after performing voltage control in the first inverter 1 as mentioned above, by providing the current command value calculated by the voltage control as the current command value of each of the second inverter 2 to the fourth inverter 4, the output currents of the four inverters 1 to 4 can be made even.

According to the inverter and the inverter device of the present embodiment, in the same manner as the first embodiment mentioned above, damage and reduction in the output voltage can both be circumvented.

In the above-mentioned embodiments, the first inverter 1 is configured to operate as a voltage source, and the second inverter 2 to the fourth inverter 4 are configured to operate as a current source; however, the first inverter 1 to the fourth inverter 4 may also be configured to operate as both the voltage source and the current source, so that they can be selected to operate as the voltage source or to operate as the current source based on signals, etc. supplied from outside. In this case, for example, when an inverter operating as the voltage source is damaged, an inverter operating as the current source may be switched to operate as the voltage source to prevent the inverter device from stopping.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An inverter comprising:
   a detector which detects a value corresponding to an output voltage and a value of an output current;
   a command value input unit which is capable of receiving a current command value;
   a current command value compensating unit which, when the value of the output voltage detected by the detector is equal to or lower than a predetermined value, computes a compensation current value for compensating the current command value;
   an adder which adds the compensation current value to the current command value and outputs the compensated current command value; and
   a current controller which computes a voltage command value so that a difference between the compensated current command value and the output current detected by the detector becomes zero.

2. The inverter according to claim 1, wherein the compensation current value increases proportional to a difference between a voltage value detected by the detector and the predetermined value.

3. An inverter device comprising:
   a first inverter which performs voltage control so that a load voltage becomes a predetermined value and frequency;
   at least one of the inverters of claim 1 which is connected in parallel with the first inverter;
   a current detector which detects a value corresponding to a load current supplied to a load from the first inverter and the inverter according to claim 1; and
   an upper command device which outputs a value that is obtained by dividing a value detected by the current detector by the number of inverters of claim 1 and the first inverter to the inverter according to claim 1 as a current command value.

4. An inverter device comprising:
   a first inverter which performs voltage control so that a load voltage becomes a predetermined value and frequency; and
   at least one of the inverters of claim 1 connected in parallel with the first inverter, wherein
   the first inverter comprises a voltage controller which computes a current command value of the first inverter based on a voltage command value, and a current controller which computes the voltage command value of the first inverter based on the current command value of the first inverter, wherein
   the current command value of the inverter of claim 1 is the current command value of the first inverter output from the voltage controller.

* * * * *